United States Patent [19]

Lee

[11] Patent Number: 5,706,147
[45] Date of Patent: Jan. 6, 1998

[54] CASSETTE LOADING DEVICE FOR TAPE RECORDER

[75] Inventor: Jae-soo Lee, Seoul, Rep. of Korea

[73] Assignee: Samsung Electronics Co., Ltd., Kyungki-do, Rep. of Korea

[21] Appl. No.: 758,002

[22] Filed: Nov. 27, 1996

[30] Foreign Application Priority Data

Dec. 27, 1995 [KR] Rep. of Korea ............... 95-59531

[51] Int. Cl.$^6$ .................................................. G11B 5/008
[52] U.S. Cl. ............................. 360/96.5; 242/338.2
[58] Field of Search .................... 360/96.5; 242/338, 242/338.2, 338.4, 339

[56] References Cited

U.S. PATENT DOCUMENTS 5,267,103  11/1993  Kohara ........................... 360/96.5

*Primary Examiner*—A. J. Heinz
*Attorney, Agent, or Firm*—Sughrue, Mion, Zinn, Macpeak & Seas, PLLC

[57] ABSTRACT

A cassette loading device having a simple structure is provided to perform the operation of a motor and the opening of a tape shield of a video tape cassette. In the cassette loading device, an opener for opening the tape shield is interlocked with a slide member for interlocking a holder, and the opener opens and closes a light passing hole.

2 Claims, 15 Drawing Sheets

CASSETTE LOADING DEVICE FOR TAPE RECORDER

BACKGROUND OF THE INVENTION

The present invention relates to a cassette loading device for a tape recorder and, more particularly, to a cassette loading device for a tape recorder, which stably loads a tape cassette on reel tables by moving a holder containing the tape cassette horizontally and vertically. In particular, the present invention relates to a cassette loading device for a tape recorder, whose structure is improved to facilitate the control of the operation of a tape shield opener for opening the tape shield of the tape cassette as the holder is moved, and the on/off switching of a loading motor.

In general, a tape recorder for recording/reproducing information on/from a magnetic tape by a rotating head drum, such as a video cassette tape recorder (VCR), is provided with a holder for moving a tape cassette onto reel tables, and guide elements for guiding the holder.

A loading operation usually begins with the insertion of the cassette by a user. That is, when a user pushes the cassette contained in the holder inside the tape recorder, a loading motor is initiated. Then, while the holder is advancing into the tape recorder, the cassette moves onto the reel tables and the tape shield is opened by the shield opener, simultaneously.

Such a tape cassette loading device is schematically illustrated in FIGS. 1 through 3.

FIG. 1 is a perspective view of a magnetic recording/reproducing deck mechanism including a holder 110 for receiving a tape cassette; FIG. 2 is an exploded perspective view of a tape cassette housing; and FIG. 3 is a perspective view of the magnetic recording/reproducing deck mechanism. Reference numeral 200 denotes a deck, and reference numeral 100 denotes the tape cassette housing for receiving the tape cassette for loading/unloading thereof. The housing 100 is fixed above the deck 200. A head drum 202 with a magnetic head 201 (see FIG. 3) is installed to rotate by a drum motor (not shown) on the deck 200.

The deck 200 also has a motor 230 for generating force, and a master gear member 240 which rotates with the driving of the motor 230.

Meanwhile, a tape cassette loading means is provided for stably loading/ejecting the tape cassette on/from two reel tables 210 and 220.

The constitution of the tape cassette loading means will be described as follows.

Referring to FIG. 2, the tape cassette housing 100 includes the holder 110 for holding the cassette, and first and second brackets 120 and 130 fixed on the deck 200 of FIG. 1, for guiding the holder 110 to move along a predetermined path in horizontal and vertical directions. At opposite side surfaces of the holder 110, there are guide pins 111 and 112, and 113 and 114, respectively. Guide slots 121 and 122, and 131 and 132 are formed in brackets 120 and 130, respectively, to engage with the guide pins 111–114. These guide slots each have horizontal and vertical portions for guiding the holder 110 along the predetermined path.

First and second arm members 140 and 150 having arm portions 141 and 151, respectively, are rotatably installed between the first and second guide brackets 120 and 130. The first and second arm members 140 and 150 are rotated together, each attached to the ends, respectively, of a shaft 160. In the arm portions 141 and 151 of the first and second arm members 140 and 150, there are guide holes 142 and 152 respectively formed to slidably engage with the guide pins 112 and 114. Torsion springs 143 and 153 are provided to elastically contact the guide pins 112 and 114 in the first and second arm members 140 and 150. The first arm member 140 is provided with a cam gear portion 144.

Referring to FIG. 3, in one portion of the deck 200 there is a slide member 170 having a first rack gear portion 171 to engage with the cam gear portion 144 and a second rack gear portion 178 to engage with the master gear member 240.

In the tape cassette loading means as constituted above, when the master gear portion 240 rotates clockwise by the motor 230, the slide member 170 interlocks with the first arm members 140, thereby moving the holder 110 along the predetermined path set by the brackets 120 and 130. The tape cassette is stably placed on or ejected from the reel driving tables 210 and 220 according to the rotating direction of the master gear member 240.

An opener 160 for lifting the tape shield (not shown) of the tape cassette is rotatably installed on the inner side surface of the first guide bracket 120. This opener 160 is elastically biased by a torsion spring 163, having an interlocking protrusion 161 for making contact and interlocking with an extended protrusion 110a formed at an edge of the holder 110, and an opening portion 162 for contacting and opening the tape shield. When the holder 110 moves, the opener 160 thereof interlocks with the extended protrusion 110a and rotates, to thereby lift the tape shield.

Meanwhile, the motor 230 is driven as follows, during a tape cassette loading. A light emitting device and light receiving devices are used to detect the beginning and the end of a tape cassette, for the operation of the motor 230. FIG. 4 illustrates the state where the cassette is not received in the holder 110; FIG. 5 illustrates the state where the cassette is being loaded; and FIG. 6 illustrates the state where the loading of cassette is completed.

A light emitting device 280 (FIG. 3) is installed at the center of the deck 200, and a light receiving device (not shown) is installed at each side of the deck 200.

Referring to FIG. 4, a combining portion 123 is formed to combine with one of the light receiving devices on a side surface of the first guide bracket 120. The combining portion 123 has a light passing hole 124 for passing light emitted from the light emitting device 280.

A shutter member 180 for opening and closing the light passing hole 124 is slidably installed on the side surface of the first guide bracket 120. A light blocking portion 184 for blocking the light passing hole 124 and a light passing portion 183 for passing light emitted from the light emitting device 280 are formed in one end portion of the shutter member 180, and a cam portion 182 for making contact with a protrusion 148 of the first arm member 140 is formed at the other end of the shutter member 180. The first shutter member 180 also has an angled slot 181 for guiding the guide pin 112 of the holder 110 and is connected to the first guide bracket 120 by a spring 125. The first shutter member 180 is moved by the first arm member 140 and the guide pin 112, and restored to its original position by the spring 125.

The motor 230 operates when light emitted from the light emitting device 280 is blocked, not when it passes through the light passing hole 124 of the first guide bracket 120.

The cassette loading device as constituted above operates as follows.

As shown in FIGS. 4 and 7A, a tape cassette 510 is inserted into the holder 110 of the housing 100. Here, because the first shutter member 180 is pulled by the spring 125, the light passing hole 124 of the first guide bracket 120 is not blocked. Thus, light from the light emitting device 280 passes through the light passing hole 124, thereby preventing the motor 230 of FIG. 3 from operating.

Then, when the tape cassette 510 is pushed in, the shutter member 180 blocks the light passing hole 124 by the pushing force, as shown in FIGS. 5 and 7B. As a result, the motor 230 operates to rotate the master gear member 240 clockwise. Then, the slide member 170 moves and the first and second arm members 140 and 150 are rotated, thereby loading the tape cassette 510. The extended protrusion 110a of FIG. 2 rotates by interlocking with the opener 160, while the holder 110 is moving. As shown in FIGS. 7C, 7D, and 7E, a tape shield 511 of a tape cassette 510 is opened.

The above tape cassette loading device, however, has drawbacks in that the number of parts is increased causing a high cost, since the opener 160 for opening the tape shield 511 and the shutter member 180 operate independently.

SUMMARY OF THE INVENTION

To overcome the above problems, an object of the present invention is to provide a cassette loading device for a tape recorder, whose structure is improved to facilitate simultaneous control of the operation of an opener for opening a tape shield of a cassette and the on/off operations of a loading motor for loading the cassette.

To achieve the above object, there is provided a cassette loading device for a tape recorder, comprising: a deck including two reel driving tables on which tape reels of a tape cassette with a tape shield are seated; a motor, disposed on the deck, which generates a driving force; a master gear member which is rotated by the motor; a holder for receiving the tape cassette; first and second guide brackets mounted to opposite sides of the deck, respectively, combined with the holder, and having guide slots for guiding the holder along a predetermined path; a slide member slidably installed proximate to one of the first and second guide brackets, having a first rack gear portion and a second rack gear portion, the first rack gear portion being connected to the master gear member, and which is moved by the rotation of the master gear member; an arm gear member having a cam gear portion connected to the second rack gear portion of the slide member and an arm portion connected to the holder, and which is rotated to move the holder by the movement of the slide member; a tape shield opener which opens the tape shield as the holder moves in a vertical direction, the tape shield opener being rotatably installed on one of the first and second guide brackets, the tape shield opener including a shutter member; a power applying device having a light emitting device installed in the center of the deck, for emitting light, and light receiving devices installed at each side of the deck, for receiving the emitted light, wherein a light passing hole is formed in each of the first and second guide brackets, and the light receiving devices receive the emitted light according to the opening and closing of the light passing hole by the shutter member of the tape shield opener, thereby operating the motor; and an interlocking mechanism which interlocks the power applying device and the tape shield opener with the slide member so that the power applying device and the tape shield opener operate together.

The interlocking mechanism includes first and second protrusions stepped with respect to each other and sequentially formed on an upper surface of the slide member, and the tape shield opener includes an interlocking protrusion which interlocks with the first and second protrusions at one end thereof, an opener portion for opening the tape shield at another end thereof, and a through-hole in the shutter member for opening and closing the light passing hole.

The cassette loading device of the present invention is simplified and can control a cassette to be stably loaded, since when the slide member moves, the tape shield opener is rotated by interlocking with the first and second protrusions of the slide member, thereby blocking the light passing hole to open the tape shield.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE PREFERRED EMBODIMENT

Figure 8:
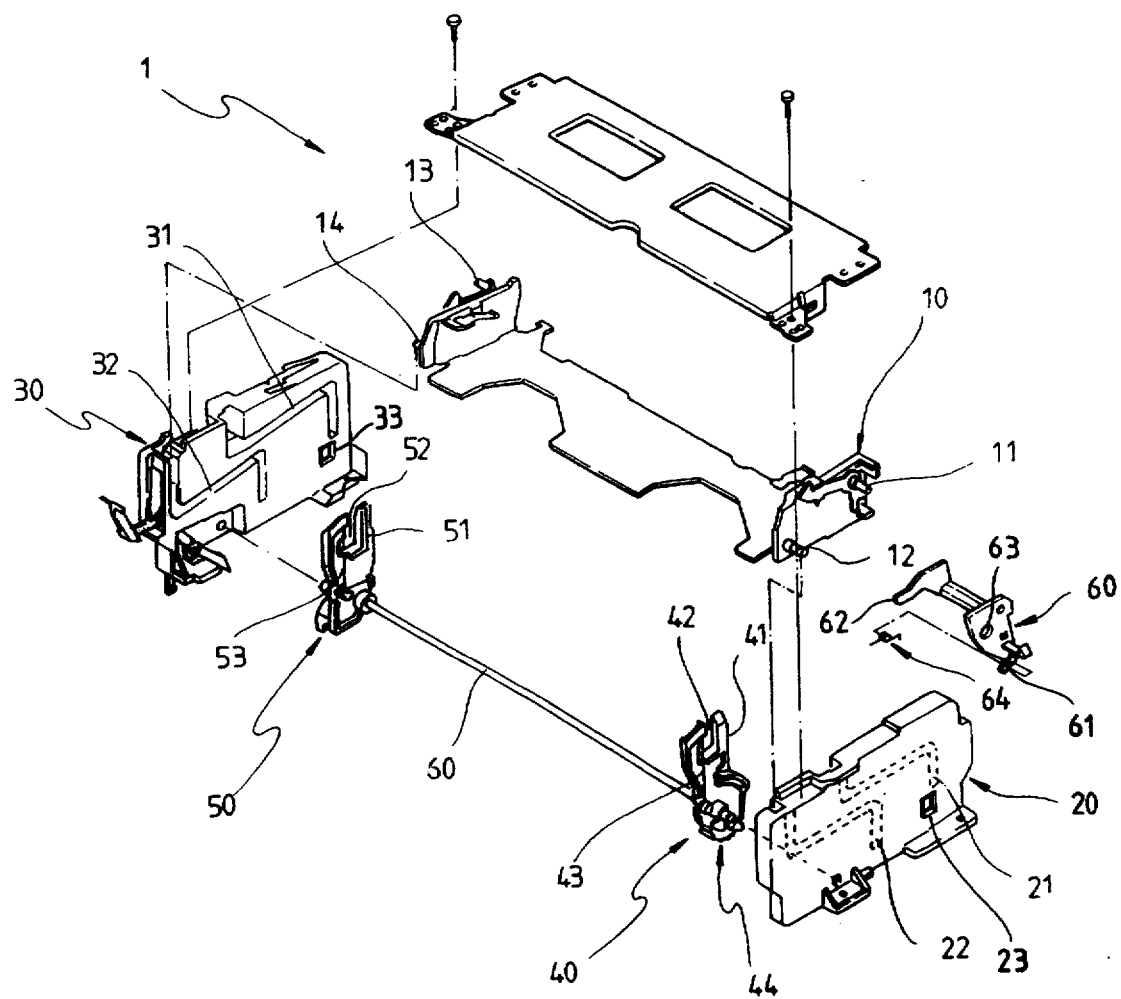
FIG. 8 is an exploded perspective view of a housing in a tape recorder according to the present invention.
Figure 9:
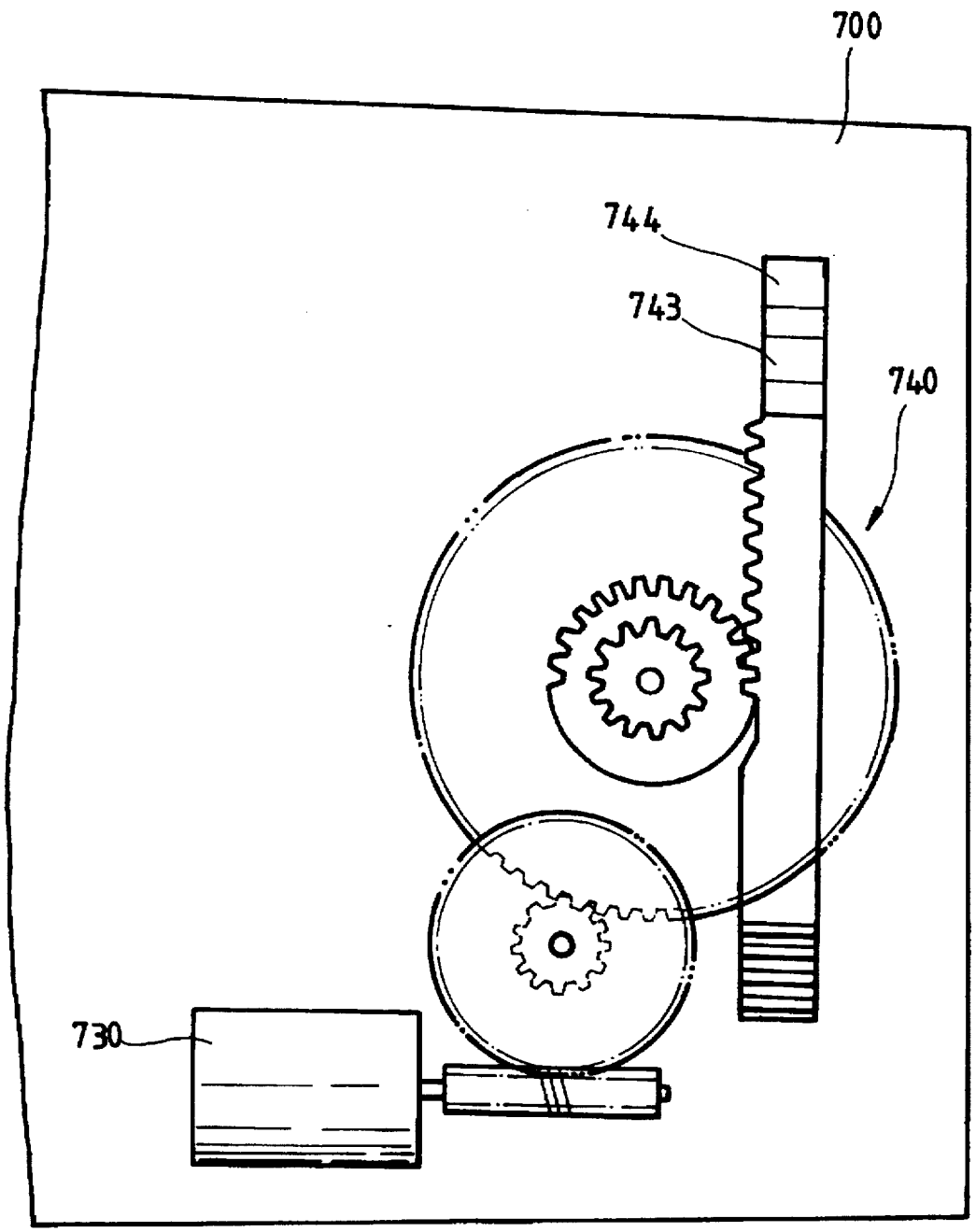
FIG. 9 is a plan view showing the connections between a motor, a master gear member, and a slide member installed on a deck according to the present invention.

FIG. 8 is an exploded perspective view of a housing 1 to be installed on a deck 700 (see FIG. 9). On the deck, a head drum and two reel driving tables, on which tape reels of a tape cassette having a general tape shield are seated, are installed. As shown in FIG. 9, a motor 730 for generating force, a drive gear 710, an intermediate gear member 720, and a master gear member 740, rotated by the motor 730, are mounted to the deck 700.

Figure 10A:
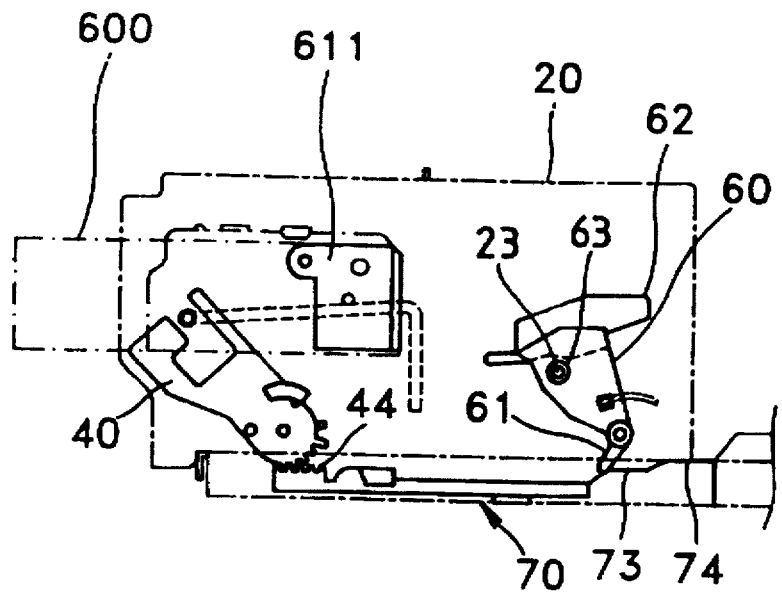
FIGS. 10A–10G are operational diagrams showing the engagement of the slide member, a first arm gear member, and an opener, during a tape cassette loading according to the present invention.
Figure 10B:
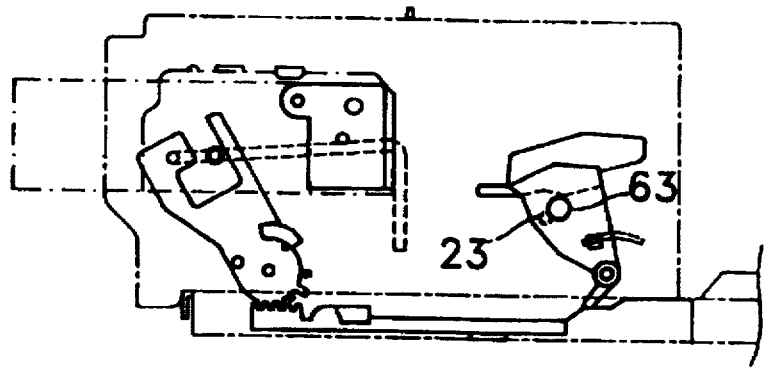
Figure 10C:
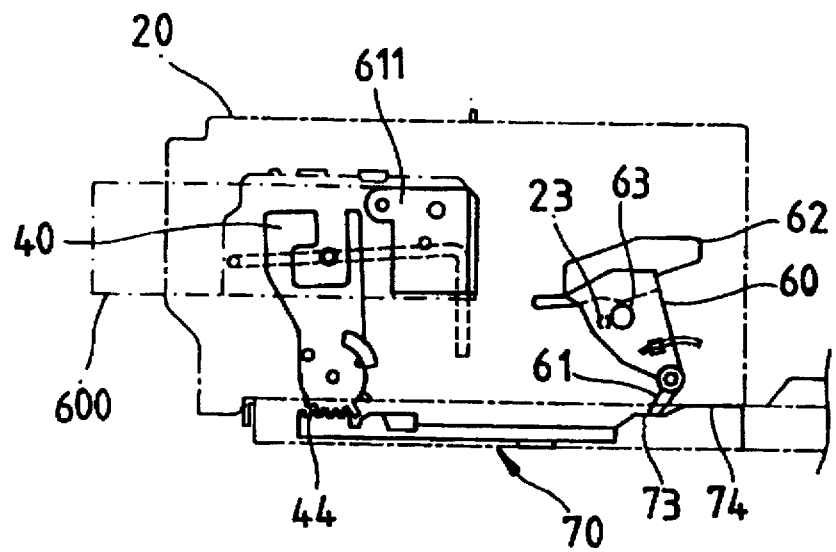
Figure 10D:
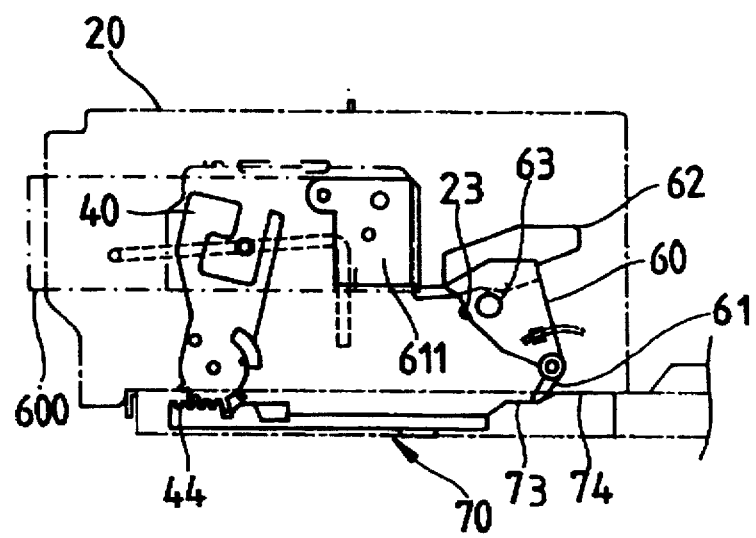
Figure 10E:
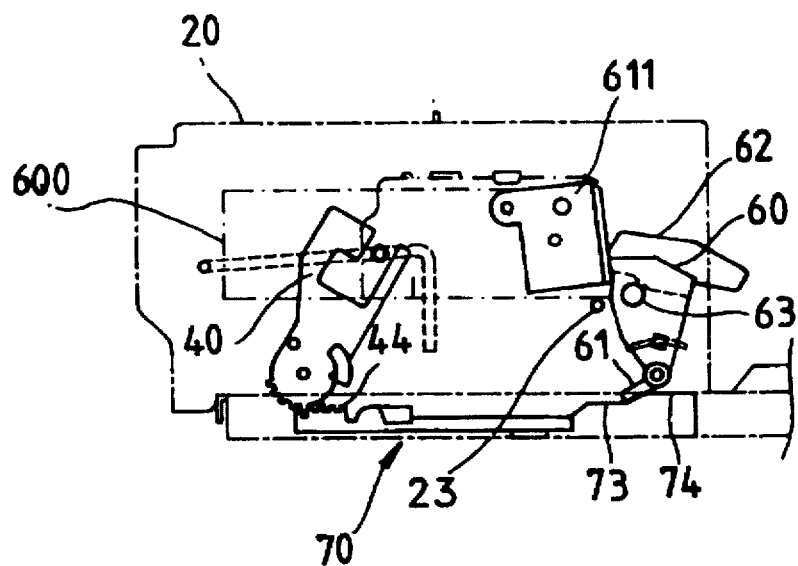
Figure 10F:
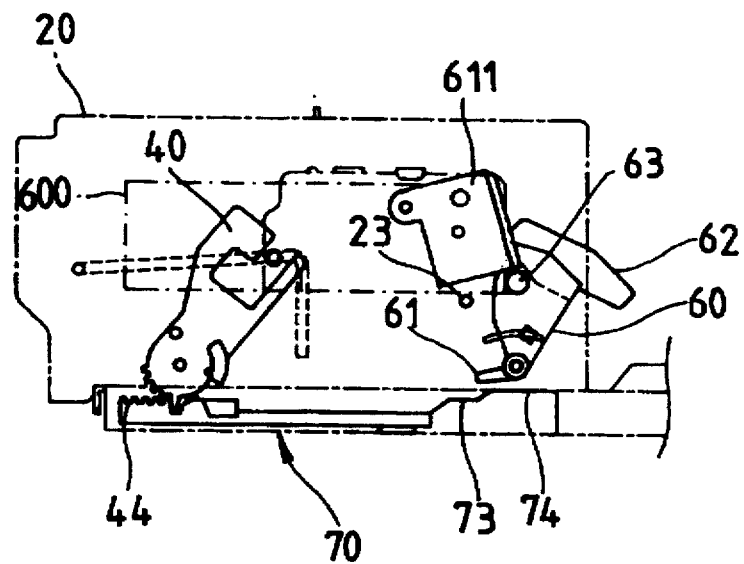
Figure 10G:
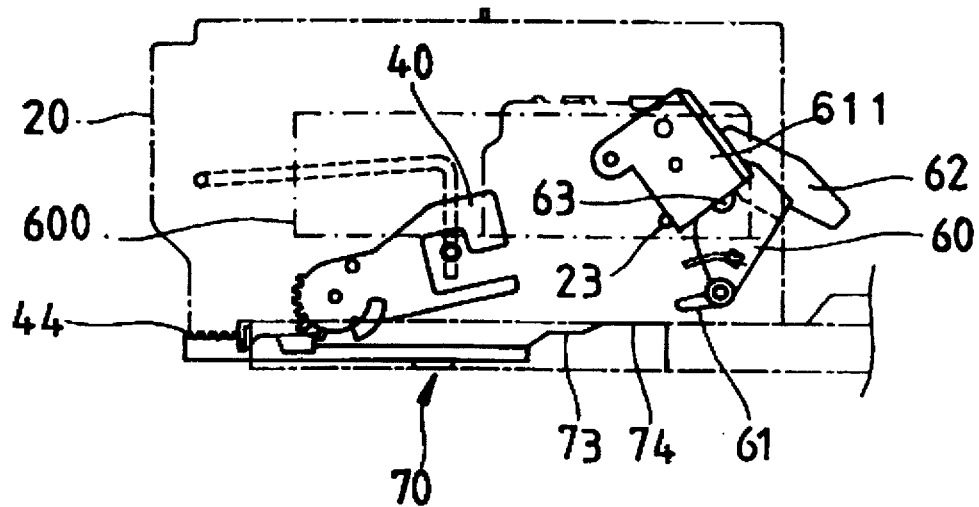
Figure 11:
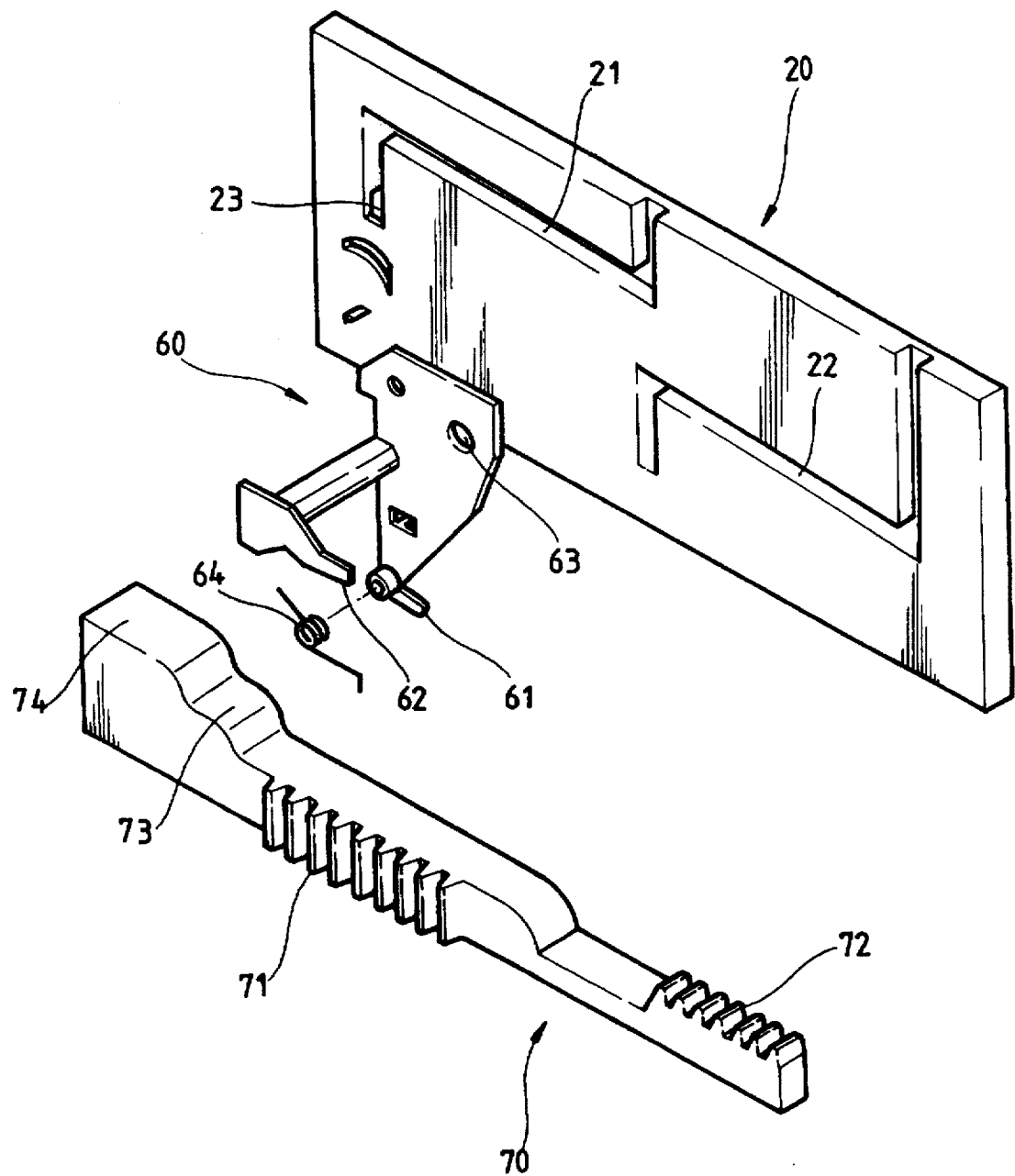
FIG. 11 is an exploded perspective view showing the engagement of the slide member, the first arm gear member, and the opener.

Referring to FIGS. 8, 9, and 11, first and second guide brackets 20 and 30 are formed at either side of the deck 700 and have guide slots 21 and 22, and 31 and 32, respectively, for guiding a holder 10 along a predetermined path. The holder 10 for receiving a tape cassette 600 (see FIGS. 10A–10G) is installed between the first and second guide brackets 20 and 30. The holder 10 is provided with guide pins 11 and 12, and 13 and 14 formed respectively on either side of the holder 10 to slidably combine with the guide slots 21 and 22, and 31 and 32 of the first and second guide brackets 20 and 30, respectively.

A slide member 70 is installed on the deck 700 to move by the rotation of the master gear member 740. A first rack gear portion 71 is formed on a side surface of the slide member 70 to engage with the master gear member 740, and a second rack gear portion 72 is formed on the upper surface of the slide member 70.

Between the first and second brackets 20 and 30, first and second arm members 40 and 50 are installed which include arm portions 41 and 51 having guide holes 42 and 52 for movably combining with the guide pins 12 and 14, respectively. The arm members 40 and 50 rotate together because they are connected to each other by a rotating shaft 60.

The first arm member 40 has a cam gear portion 44 which connects to the second rack gear portion 72 of the slide member 70. The first and second arm members 40 and 50, therefore, are rotated by the movement of the slide member 70, thereby moving the holder 10 along the path set by the guide slots 21, 22, 31, and 32. Reference numerals 43 and 53 denote torsion springs for pressing against the guide pins 12 and 14 of the holder 10.

Figure 1:
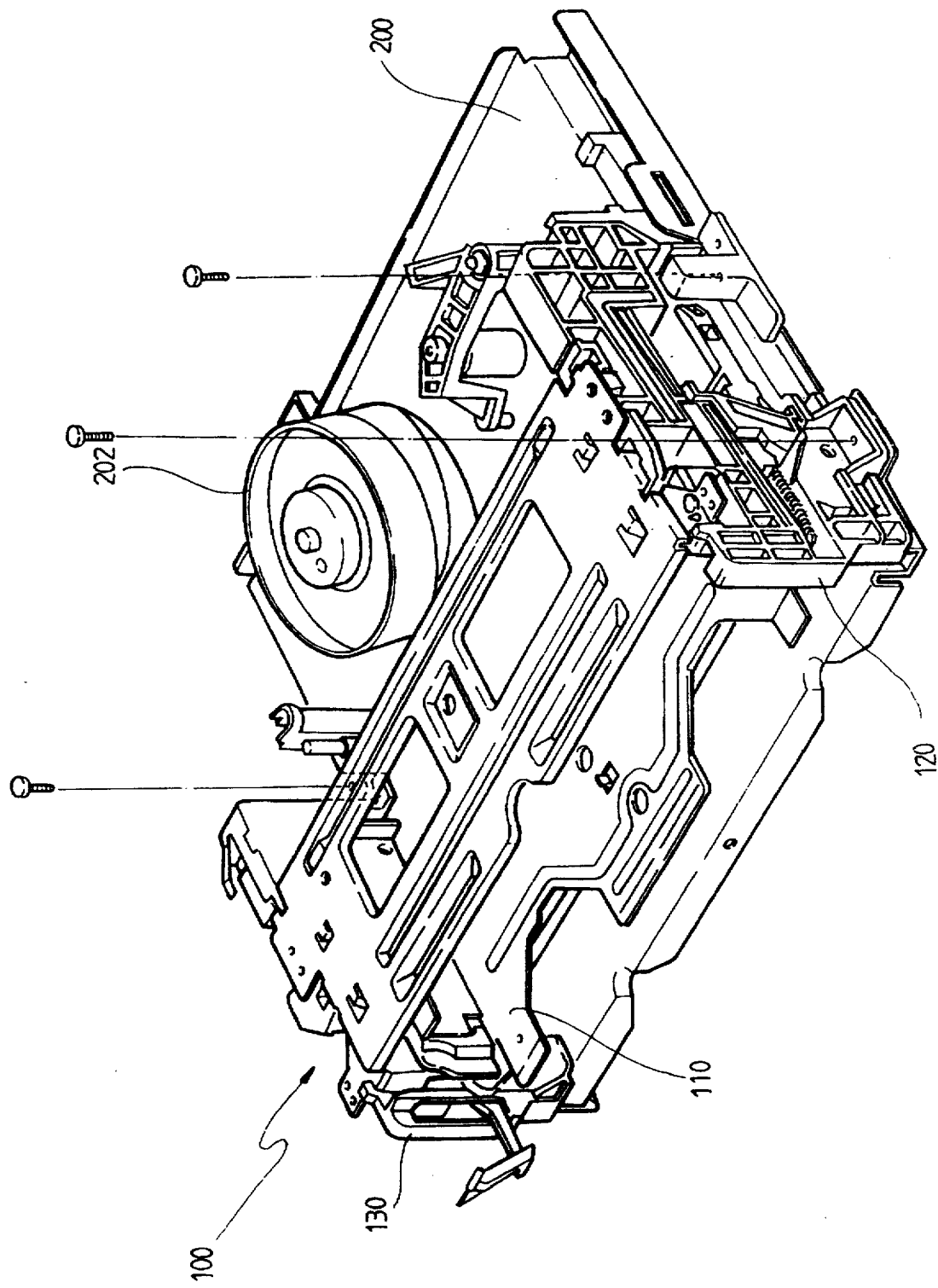
FIG. 1 is a perspective view of a portion of a tape recorder having a housing assembled on a deck.
Figure 2:
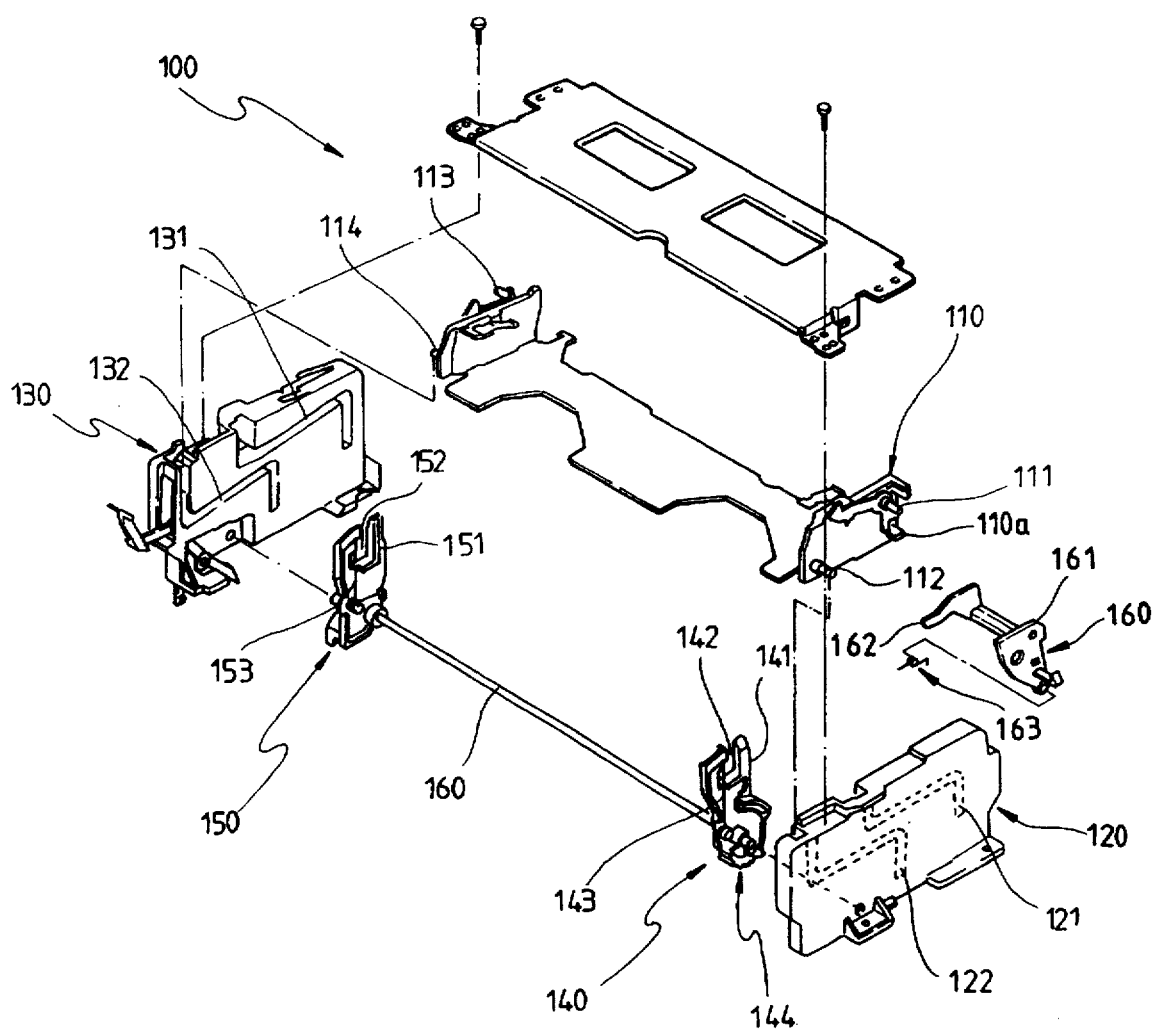
FIG. 2 is an exploded perspective view of the housing shown in FIG. 1.
Figure 3:
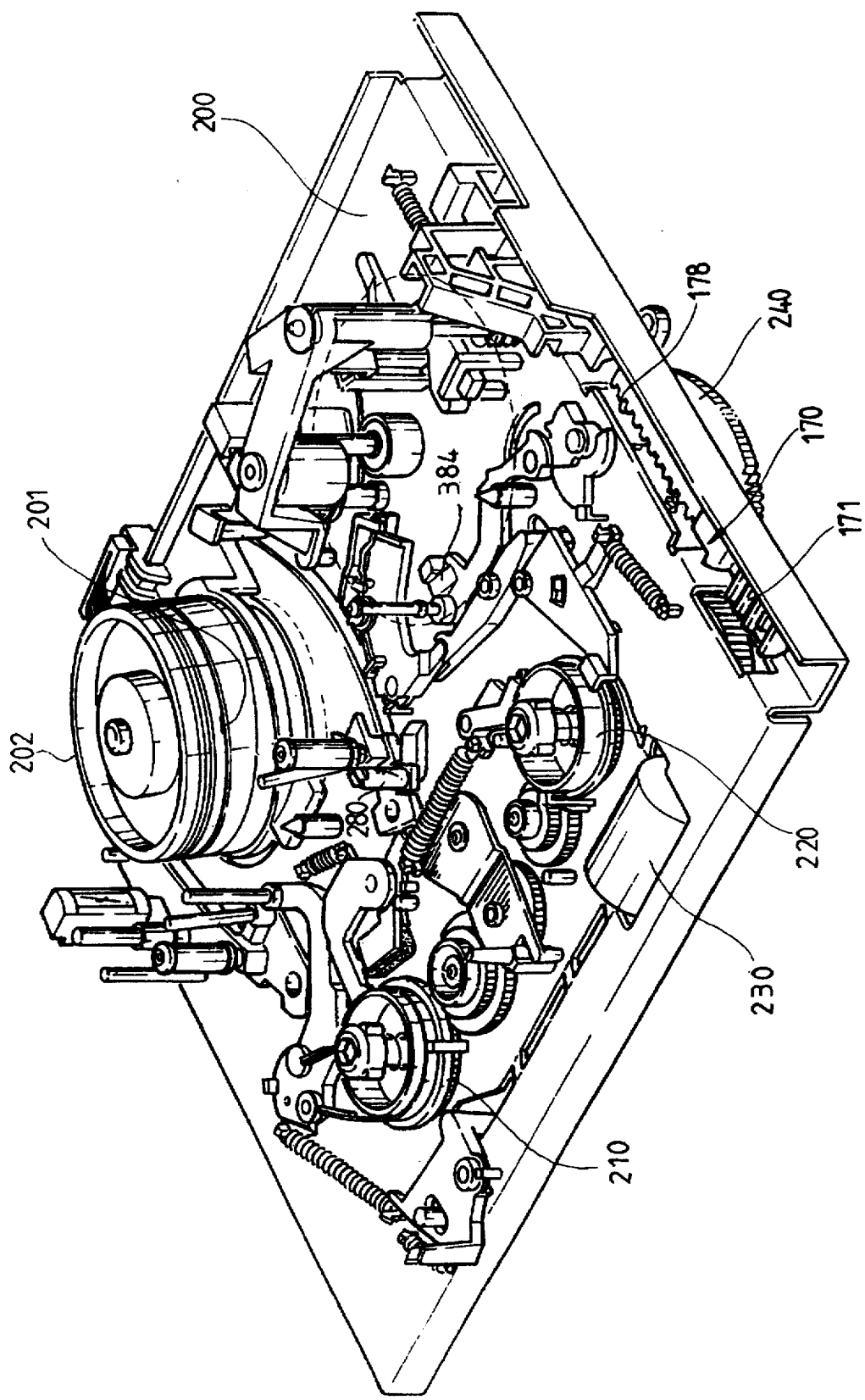
FIG. 3 is a perspective view of the deck separated from the housing of FIG. 1.
Figure 4:
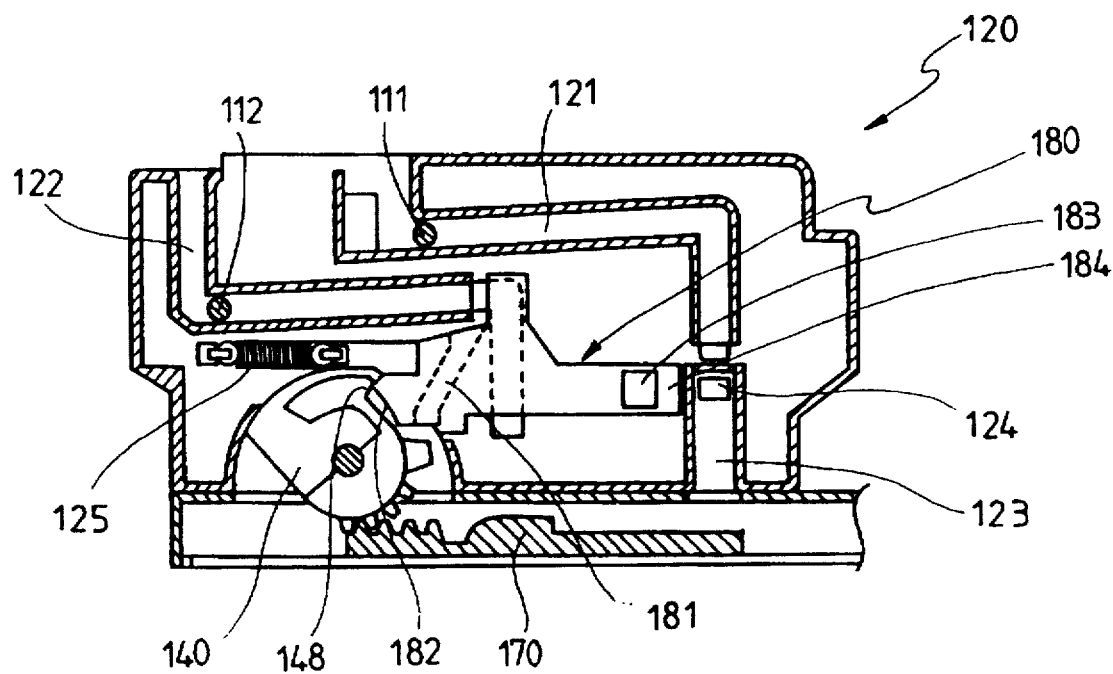
FIGS. 4–6 are schematic sectional diagrams showing the operational states of a shutter member during loading of a tape cassette.
Figure 5:
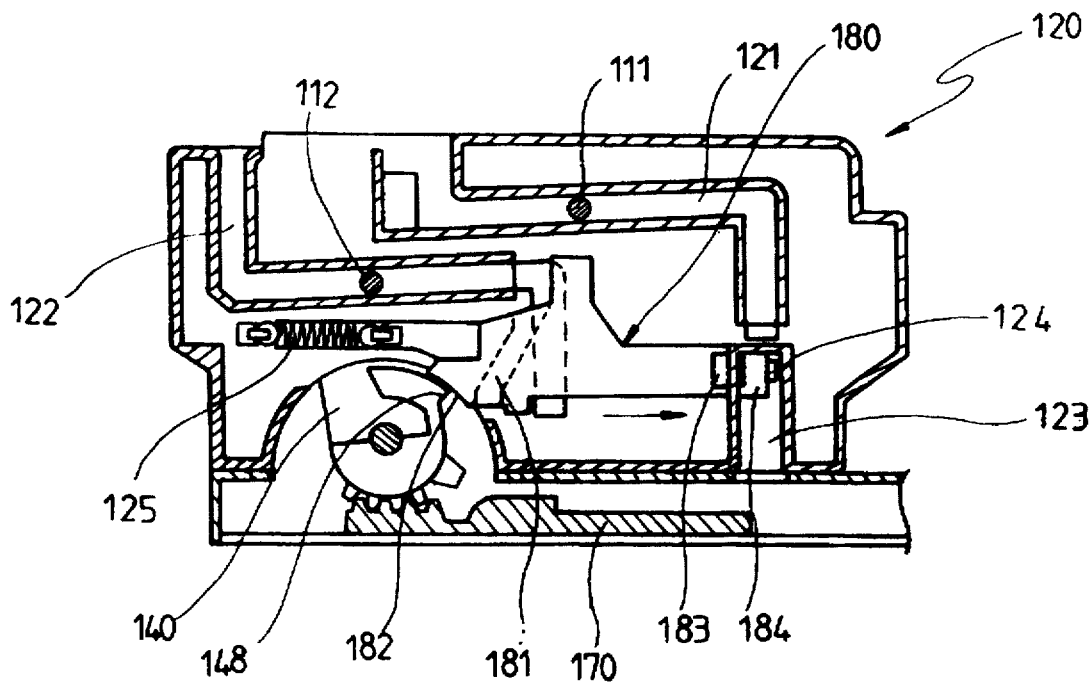
Figure 6:
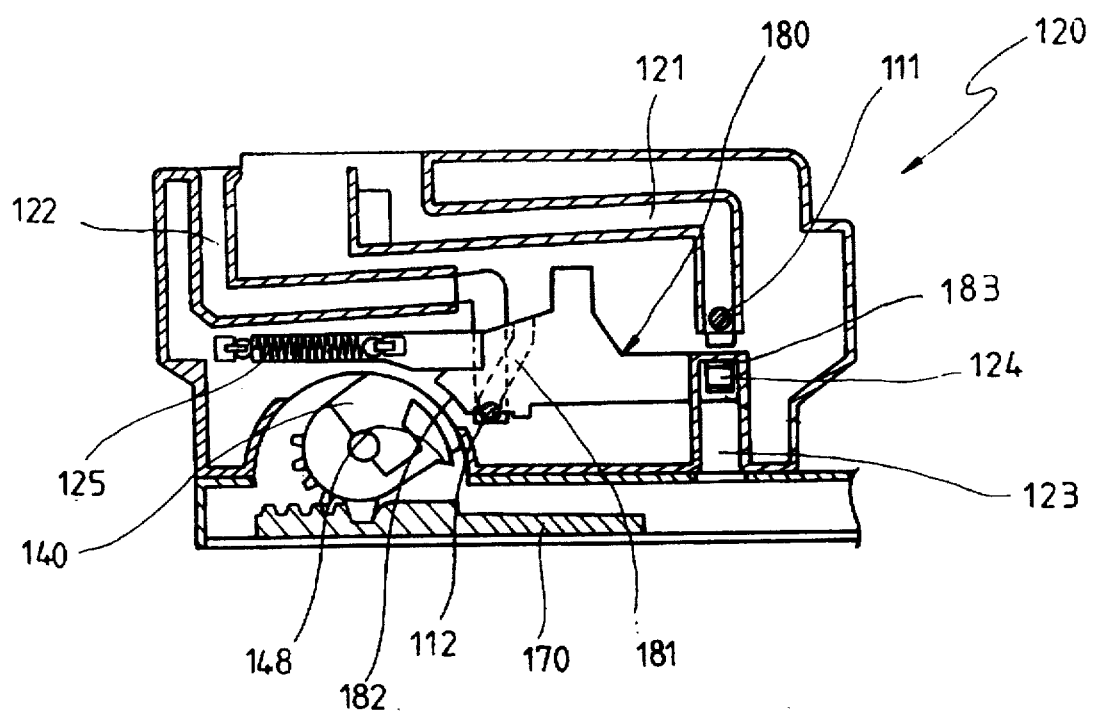
Figure 7A:
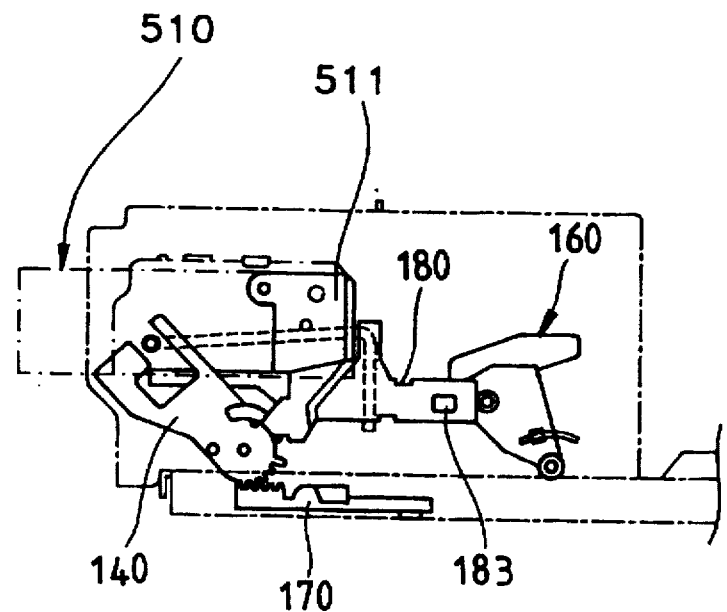
FIGS. 7A–7E are operational diagrams showing the engagement of a master gear member, a slide member, and a first arm gear member during cassette loading in a conventional device.
Figure 7B:
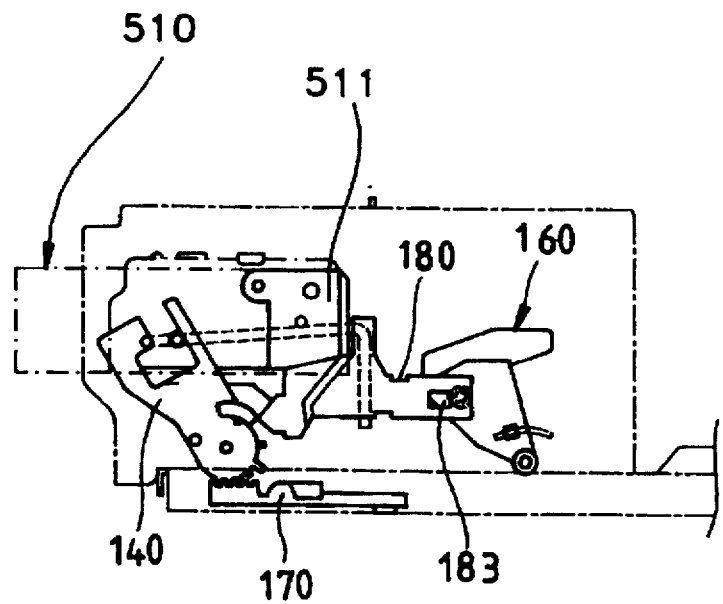
Figure 7C:
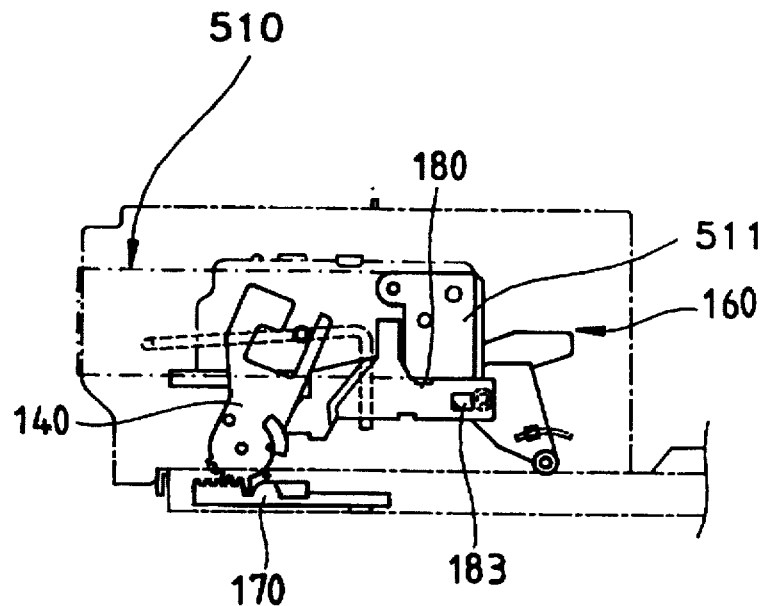
Figure 7D:
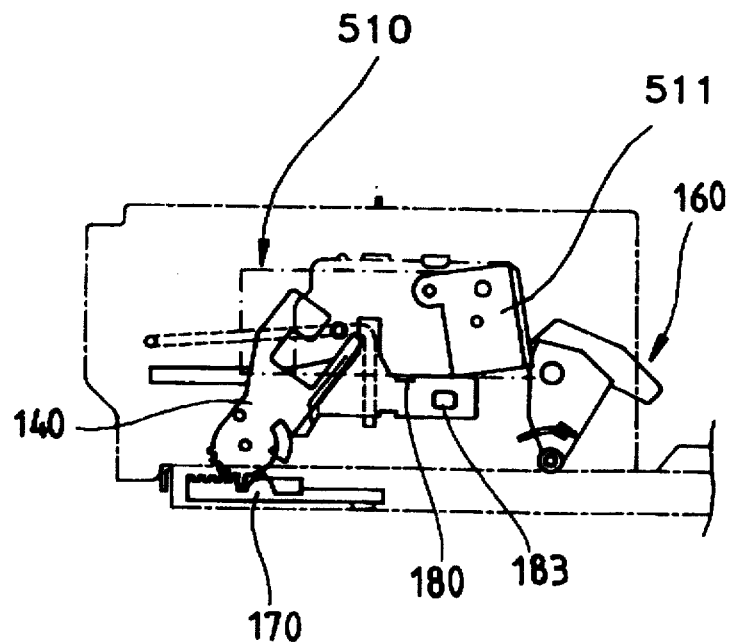
Figure 7E:
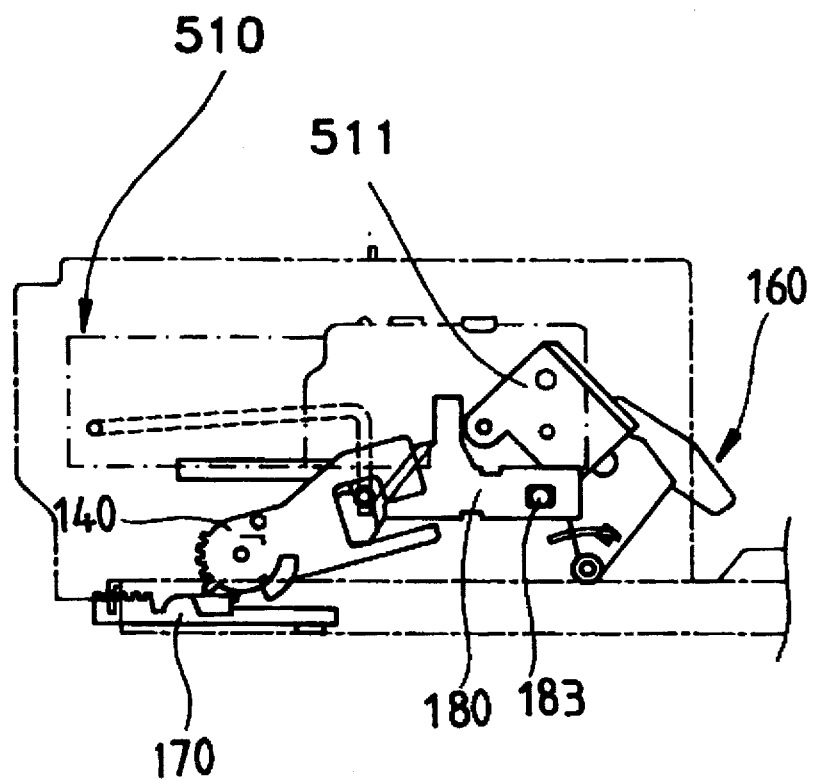

For the operation of the holder, a power applying device is provided and includes a light emitting device for emitting light, as in the conventional device (see FIG. 3), is installed in the center of the deck 700, and a light receiving device for receiving the emitted light is installed at each side of the deck 700. The first and second guide brackets 20 and 30 have light passing holes 23 and 33 for passing the light, respectively. The power applying device is provided so that the light receiving devices receive the light by opening and closing the light passing holes 23 and 33 and thus applies power to the motor 730.

A tape shield opener 60 is provided on the inner side of the first guide bracket 20, to lift open the tape shield of a cassette when the holder 10 moves vertically.

Meanwhile, an interlocking mechanism is provided as a characteristic feature of the present invention, which interlocks the power applying device and tape shield opener with the slide member so that the power applying device and the tape shield opener operate together.

Referring to FIG. 11, the interlocking mechanism is constituted as follows. A first protrusion 73 and a second protrusion 74 being stepped with respect to each other are sequentially formed on the slide member 70. The tape shield opener 60 is rotatably installed on the first bracket 20. The tape shield opener 60 has an interlocking protrusion 61, for interlocking or engaging with the first and second protrusions 73 and 74, at one end thereof, an opening portion 62, for opening a tape shield 611, at the other end thereof, and a shutter member S having a through-hole 63 for opening and closing the light passing hole 23. The tape shield opener 60 is elastically biased by a torsion spring 64.

The interlocking mechanism as constituted above operates such that as the slide member 70 moves, the opener 60 is rotated, thus opening and closing the light passing hole 23 and opening the tape shield 611.

The cassette loading device of the present invention, as constituted above, has the following operational effects.

First, the cassette 600 is inserted into the holder 10, as shown in FIG. 10A. At this stage, the light passing hole 23 of the first guide bracket 20 can receive light emitted from the light emitting device since it is aligned with the through-hole 63 in the shutter member S of the opener 60. Hence, power is not applied to the motor 730. Then, when the cassette 600 is pushed in, the slide member 70 engages with the cam gear portion 44 of the rotating first arm member 40 and is moved to the left in FIG. 10A. As shown in FIG. 10B, when the slide member 70 is moved slightly to the left and thus the interlocking protrusion 61 of the opener 60 comes into contact with the first protrusion 73 of the slide member 70, the opener 60 rotates clockwise. At this stage, the light passing hole 23 is blocked by the shutter S of the opener 60, resulting in prevention of the light receiving devices from receiving light. Consequently, power is applied to the motor 730.

The slide member 70, then, is moved to the left by the force of motor 730. As shown in FIG. 10C, as the interlocking protrusion 61 of the opener 60 comes into contact and is interlocked or engaged with the second protrusion 74 of the slide member 70, it is further rotated clockwise. The interlocking protrusion 61 keeps the opener in its rotated position by the support of the second protrusion 74.

On the other hand, as shown in FIG. 10D, while the holder 10 is moved horizontally to the right side of the slide member 70, the tape shield 611 of the cassette 600 is brought into contact with the opening portion 62 of the opener 60.

As shown in FIGS. 10E, 10F, and 10G, while the holder 10 moves down along the vertical portion of the guide slot of the first guide bracket 20, the tape shield 611 of the cassette 600 contacts the opening portion 62 and is opened.

As described above, the cassette loading device for a tape recorder according to the present invention is advantageous in terms of structural simplicity, because the present device performs power application to the motor 730 and the opening of the tape shield 611 of the cassette 600 with a reduced number of parts, in contrast to the conventional device where a shutter member for blocking light and an opener for opening a tape shield are separately provided.

It is contemplated that numerous modifications may be made to the cassette loading device of the present invention without departing from the spirit and scope of the invention as defined in the following claims.

What is claimed is:

1. A cassette loading device for a tape recorder, comprising:

a deck including two reel driving tables on which tape reels of a tape cassette with a tape shield are seated;

a motor, disposed on said deck, which generates a driving force;

a master gear member which is rotated by said motor;

a holder for receiving said tape cassette;

first and second guide brackets mounted to opposite sides of said deck, respectively, combined with said holder, and having guide slots for guiding said holder along a predetermined path;

a slide member slidably installed proximate to one of said first and second guide brackets, having a first rack gear portion and a second rack gear portion, said first rack gear portion being connected to said master gear member, and which is moved by the rotation of said master gear member;

an arm gear member having a cam gear portion connected to said second rack gear portion of said slide member and an arm portion connected to said holder, and which is rotated to move said holder by the movement of said slide member;

a tape shield opener which opens said tape shield as said holder moves in a vertical direction, said tape shield opener being rotatably installed on one of said first and second guide brackets, said tape shield opener including a shutter member;

a power applying device having a light emitting device installed in the center of said deck, for emitting light, and light receiving devices installed at each side of said deck, for receiving said emitted light, wherein a light passing hole is formed in each of said first and second guide brackets, and said light receiving devices receive said emitted light according to the opening and closing of said light passing hole by said shutter member of said tape shield opener, thereby operating said motor; and an interlocking mechanism which interlocks said power applying device and said tape shield opener with said slide member so that said power applying device and said tape shield opener operate together.

2. The cassette loading device for a tape recorder as claimed in claim 1, wherein said interlocking mechanism comprises first and second protrusions stepped with respect to each other and sequentially formed on an upper surface of said slide member, and said tape shield opener further includes an interlocking protrusion which interlocks with said first and second protrusions at one end thereof, an opener portion for opening said tape shield at another end thereof, and a through-hole in said shutter member for opening and closing said light passing hole.

* * * * *